United States Patent
Kottilingam et al.

(10) Patent No.: US 8,870,523 B2
(45) Date of Patent: Oct. 28, 2014

(54) METHOD FOR MANUFACTURING A HOT GAS PATH COMPONENT AND HOT GAS PATH TURBINE COMPONENT

(75) Inventors: Srikanth Chandrudu Kottilingam, Simpsonville, SC (US); David Vincent Bucci, Simpsonville, SC (US); Benjamin Paul Lacy, Greer, SC (US); Kathleen Blanche Morey, Scotia, NY (US); Brian Lee Tollison, Honea Path, SC (US); Patrick Thomas Walsh, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1151 days.

(21) Appl. No.: 13/042,167

(22) Filed: Mar. 7, 2011

(65) Prior Publication Data

US 2013/0139510 A1  Jun. 6, 2013

(51) Int. Cl.
| | |
|---|---|
| *F01D 5/14* | (2006.01) |
| *B23P 15/04* | (2006.01) |
| *F02C 7/00* | (2006.01) |
| *F01D 9/04* | (2006.01) |
| *B23K 31/02* | (2006.01) |

(52) U.S. Cl.
CPC ... *F02C 7/00* (2013.01); *F01D 9/04* (2013.01); *B23K 31/02* (2013.01); *F05D 2230/237* (2013.01); *F05D 2240/11* (2013.01); *F05D 2260/20* (2013.01)
USPC ........................................ 415/115; 29/889.22

(58) Field of Classification Search
USPC ..................... 415/115, 116; 29/889.2, 889.22
See application file for complete search history.

(56) References Cited

U.S. PATENT DOCUMENTS

| | | |
|---|---|---|
| 4,988,266 A | 1/1991 | Nakamura et al. |
| 5,169,287 A | 12/1992 | Proctor et al. |
| 5,957,657 A | 9/1999 | Akita et al. |
| 6,223,524 B1 | 5/2001 | Durcan |
| 6,461,108 B1 | 10/2002 | Lee et al. |
| 6,528,118 B2 | 3/2003 | Lee et al. |
| 6,679,680 B2 | 1/2004 | Um et al. |
| 6,899,518 B2 | 5/2005 | Lucas et al. |
| 7,284,954 B2 | 10/2007 | Parker et al. |
| 7,487,641 B2 | 2/2009 | Frechette et al. |
| 7,653,994 B2 | 2/2010 | Dasilva et al. |
| 7,740,442 B2 | 6/2010 | Lee et al. |
| 7,900,458 B2 | 3/2011 | James et al. |
| 2002/0106457 A1 | 8/2002 | Lee et al. |
| 2005/0232752 A1 | 10/2005 | Meisels |
| 2007/0025837 A1 | 2/2007 | Pezzetti et al. |
| 2007/0205189 A1 | 9/2007 | Grossklaus, Jr. et al. |
| 2009/0031564 A1 | 2/2009 | Meier |
| 2009/0053045 A1 | 2/2009 | Nowak et al. |

(Continued)

OTHER PUBLICATIONS

Extended European Search Report for EP Application No. 13165262.0-1610, dated Dec. 4, 2013, pp. 1-6.

*Primary Examiner* — Dwayne J White
(74) *Attorney, Agent, or Firm* — Cantor Colburn LLP

(57) ABSTRACT

According to one aspect of the invention, a method for manufacturing a hot gas path component of a turbine is provided, the method including forming cooling channels in a surface of a member. The method also includes disposing a layer on the surface of the member to enclose the cooling channels, the layer being disposed on a portion of the member to be cooled and bonding the layer to the surface, wherein bonding comprises heating the member and the layer.

18 Claims, 5 Drawing Sheets

(56) References Cited

U.S. PATENT DOCUMENTS

2009/0255117 A1 10/2009 Hovel et al.
2012/0036858 A1* 2/2012 Lacy et al. .................... 60/754
2012/0057969 A1 3/2012 Jiang et al.
2012/0076650 A1 3/2012 Akiyama et al.
2012/0114912 A1 5/2012 Bunker et al.

* cited by examiner

US 8,870,523 B2

METHOD FOR MANUFACTURING A HOT GAS PATH COMPONENT AND HOT GAS PATH TURBINE COMPONENT

BACKGROUND OF THE INVENTION

The subject matter disclosed herein relates to turbomachinery. More particularly, the subject matter relates to cooling passages in hot gas path components of turbines.

In a turbine, a combustor converts the chemical energy of a fuel or an air-fuel mixture into thermal energy. The thermal energy is conveyed by a fluid, often compressed air from a compressor, to a turbine where the thermal energy is converted to mechanical energy. As part of the conversion process, hot gas is flowed over and through portions of the turbine. High temperatures along the hot gas path can heat turbine components, causing degradation of components. Forming cooling channels in the components by casting may limit the proximity of the channels to the surface of the component to be cooled. Accordingly, the effectiveness of cooling channels is limited, thereby increasing thermal stress experienced by turbine components along the hot gas path.

BRIEF DESCRIPTION OF THE INVENTION

According to one aspect of the invention, a method for manufacturing a hot gas path component of a turbine is provided, the method including forming cooling channels in a surface of a member. The method also includes disposing a layer on the surface of the member to enclose the cooling channels, the layer being disposed on a portion of the member to be cooled and bonding the layer to the surface, wherein bonding comprises heating the member and the layer.

According to another aspect of the invention, hot gas path turbine component, the component including a member with cooling channels formed in a surface of the member. The component also includes a layer disposed on the surface of the member to enclose the cooling channels, wherein a thickness of the layer is less than about 0.8 mm and wherein the layer is bonded to the surface by heating the member and the layer.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
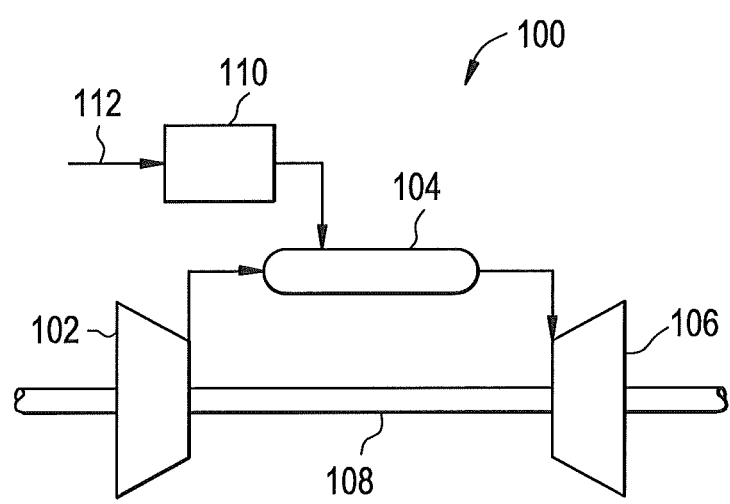
FIG. 1 is a schematic diagram of an embodiment of a turbomachine system.

FIG. 1 is a schematic diagram of an embodiment of a turbomachine system, such as a gas turbine system 100. The system 100 includes a compressor 102, a combustor 104, a turbine 106, a shaft 108 and a fuel nozzle 110. In an embodiment, the system 100 may include a plurality of compressors 102, combustors 104, turbines 106, shafts 108 and fuel nozzles 110. The compressor 102 and turbine 106 are coupled by the shaft 108. The shaft 108 may be a single shaft or a plurality of shaft segments coupled together to form shaft 108.

In an aspect, the combustor 104 uses liquid and/or gas fuel, such as natural gas or a hydrogen rich synthetic gas, to run the engine. For example, fuel nozzles 110 are in fluid communication with an air supply and a fuel supply 112. The fuel nozzles 110 create an air-fuel mixture, and discharge the air-fuel mixture into the combustor 104, thereby causing a combustion that creates a hot pressurized exhaust gas. The combustor 100 directs the hot pressurized gas through a transition piece into a turbine nozzle (or "stage one nozzle"), and other stages of buckets and nozzles causing turbine 106 rotation. The rotation of turbine 106 causes the shaft 108 to rotate, thereby compressing the air as it flows into the compressor 102. In an embodiment, hot gas path components, including, but not limited to, shrouds, diaphragms, nozzles, buckets and transition pieces are located in the turbine 106, where hot gas flow across the components causes creep, oxidation, wear and thermal fatigue of turbine parts. Controlling the temperature of the hot gas path components can reduce distress modes in the components. The efficiency of the gas turbine increases with an increase in firing temperature in the turbine system 100. As the firing temperature increases, the hot gas path components need to be properly cooled to meet service life. Components with improved arrangements for cooling of regions proximate to the hot gas path and methods for making such components are discussed in detail below with reference to FIGS. 2-5. Although the following discussion primarily focuses on gas turbines, the concepts discussed are not limited to gas turbines.

Figure 2:
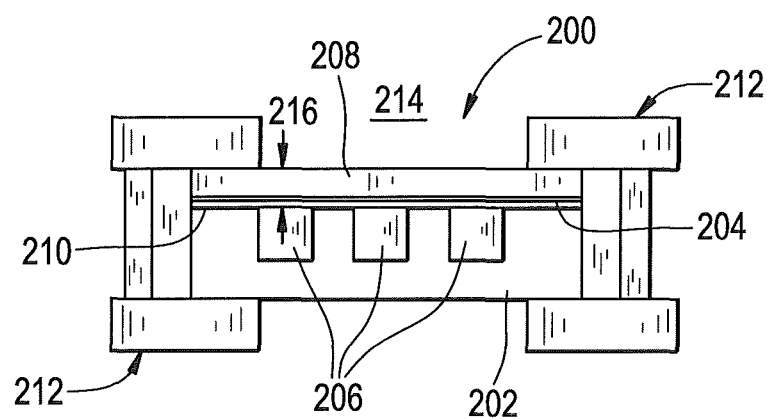
FIG. 2 is a schematic side view of an exemplary hot gas path component to be placed in a gas turbine.

FIG. 2 is a schematic side view of an exemplary hot gas path component 200. The hot gas path component 200 has an arrangement that improves cooling along the hot gas path, wherein a brazing or other suitable process is used to form the hot gas path component 200. The hot gas path component 200 includes a member 202 with a surface 204, wherein one or more channels 206 are formed in the surface 204. The hot gas path component 200 also includes a layer 208 with a filler material 210 disposed between the layer 208 and the member 202. During an assembly process, the parts of the hot gas path component 200 are held together by a clamping device 212. An exemplary manufacturing process for the hot gas path component 200 includes the following steps. Channels 206 are formed in the member 202 by a suitable method, such as milling. The filler material 210 is then placed on the surface 204 of the member 202. The layer 208 is placed on the filler material 210 and the surface 204, thereby enclosing channels 206. In one embodiment, the clamping devices 212 are configured to compress and hold the layer 208 and member 202 together during a heating cycle, such as those used in a brazing process.

Thus, when assembled, a brazing process heats the member 202, filler material 210 and layer 208 to a selected temperature for a selected amount of time, wherein the selected temperature is above a melting point of the filler material 210 and below a melting point of the member 202 and the layer 208. Exemplary heating cycles for brazing include heating the hot gas path component to a temperature between about 1800 and about 2175 degrees Fahrenheit for about 10 minutes. In some embodiments, the heating cycle is to greater than about 2125 degrees Fahrenheit. The heating process melts the exemplary filler material 404, which may include a compound comprising boron, silicon and nickel (e.g., BNi-2, BNi-3, BNi-5). Exemplary materials for the member 202 and the layer 208 include alloys, such as nickel and cobalt base superalloys. After the heating cycle, the hot gas path component 200 is then cooled, thereby forming a bond between the member 202 and the layer 208 via the hardened filler material 210. The clamping devices 212 are optionally used to prevent decoupling (or "potato chipping") of portions of the hot gas path component 200 during the heating and cooling cycles.

After assembly and the brazing process, the hot gas path component 200 is configured to direct a cooling fluid through channels 206 to cool the hot gas path component 200 as hot gas passes along region 214 during turbine operation. By brazing the layer 208, a relatively small distance 216 is provided between the cooling channel 206 and the region 214 to be cooled. In an embodiment, the filler material 210 is a foil layer or a paste applied to the surface 210, wherein the filler material 210 provides a bond as it is heated and cooled. In embodiments, the member 202, the surface 204 and the layer 208 are curved, thereby enabling a cooling of a curved surface of the exemplary hot gas path component 200. Other shapes or surfaces are also contemplated, such as twisted or wavy surfaces. Exemplary curved hot gas path components 200 include a bucket, a nozzle or other curved member along a hot gas path of a turbine. The depicted arrangement and method for making the hot gas path component 200 provides improved cooling for the component, thereby reducing creep, oxidation and thermal fatigue while improving performance of the turbine.

Figure 3:
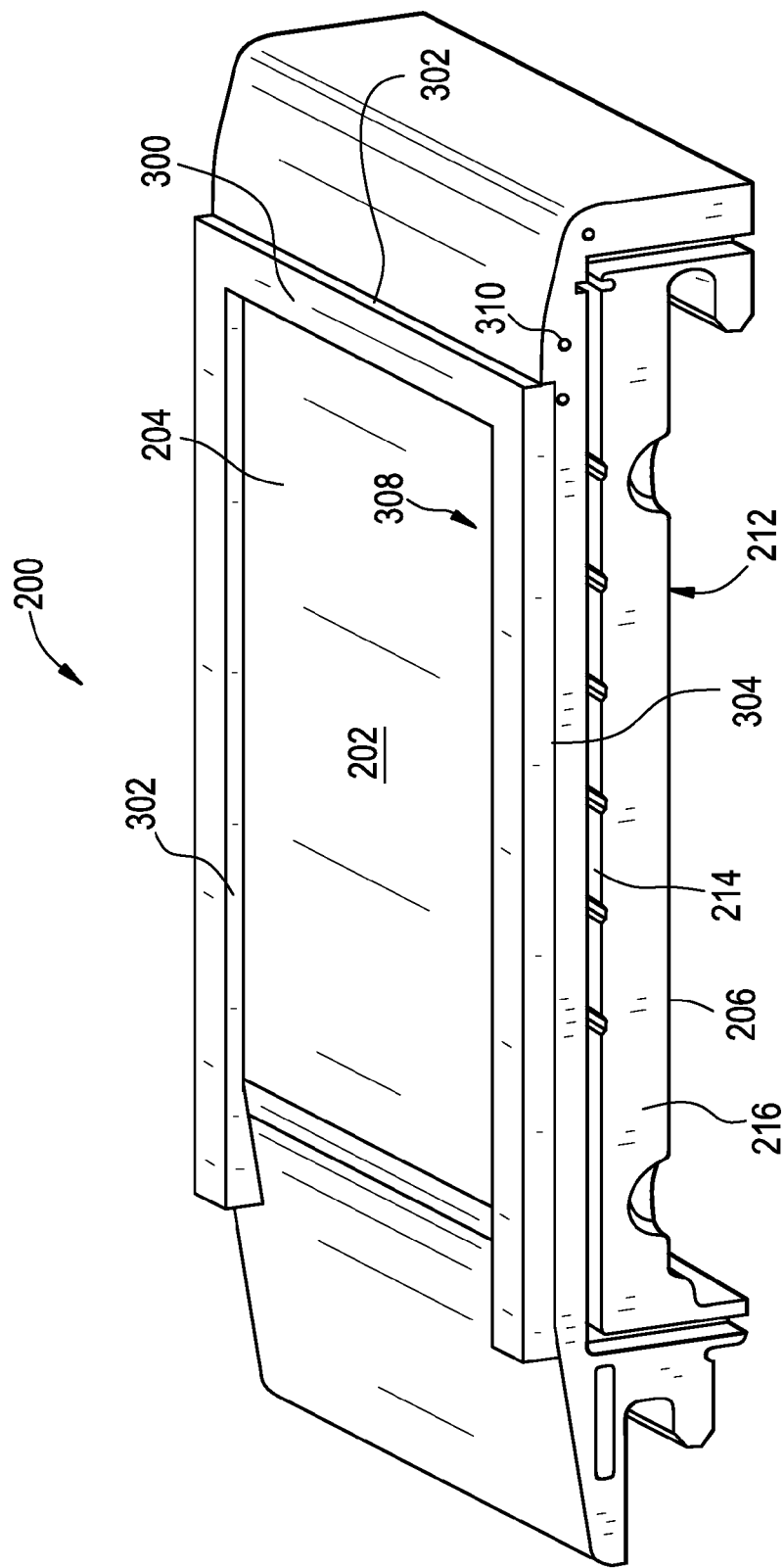
FIG. 3 is a perspective view of an embodiment of a hot gas path component to be placed in a gas turbine.

FIG. 3 is a perspective view of an embodiment of a hot gas path component to be placed in the gas turbine 100. As depicted, the exemplary hot gas path component is an embodiment of a stage one shroud 300. The shroud 300 includes a member 302 with a surface 304 proximate to a hot gas path in the turbine 100. The shroud 300 also includes a surface 306 proximate to cool fluid and/or air in the turbine 100. To improve cooling of the member 302, one or more channels 308 are formed in the surface 304, wherein the channels 308 are configured to cool the surface 304 by flowing a cooling fluid. The cooling fluid flows through holes 310 to channels 308. A fluid supply 312, such as a chamber and/or a pump, provides the cooling fluid, which may include air, a water solution and/or a gas. The shroud 300 is configured to interface with a similar adjacent shroud via a seal to be placed in a seal slot 314 in interface surface 316. In an embodiment, the seal and joined interface surface 316 reduces leakage of cool air from the surface 306 into the hot gas path, thereby providing high temperature hot gas to convert from thermal energy to mechanical energy inside the turbine 100. As will be described in detail with reference to FIG. 4, the channels 308 are covered by a layer to form a substantially flush surface 304 and enclose the channels 308.

As depicted, the channels 308 are configured to control a temperature of surface 304. The cooling fluid flows from fluid supply 312 through holes 310 into channels 308, wherein the proximity and configuration of channels 308 in relation to surface 304 provides improved cooling of the shroud 300. In embodiments, the cooling channels 308 are formed in turbine components proximate a hot gas flow path. Exemplary turbine components along the hot gas path include, but are not limited to, shrouds, nozzles, buckets and diaphragms. For example, the channels 308 are formed in a surface of sidewall of a nozzle assembly, wherein the channels are configured to cool the sidewall to reduce thermal fatigue for the nozzle assembly. The channels 308 may be formed in the member 302 by any suitable method, such as by investment casting during formation of the member 302. Another exemplary technique to form the channels 308 includes removing material from the member 302 after it has been formed. Removal of material to form channels 308 may include any suitable method, such as by using a water jet, a mill, a laser, electric discharge machining, any combination thereof or other suitable machining or etching process. As depicted, the cooling channels 308 are in a U configuration (when line of sight is perpendicular to the surface 304), however, the channels 308 may be formed in any suitable configuration for cooling including an S, O, Z or other suitable configuration. By using a material removal process, complex and intricate patterns may be used to form the channels 308 based on component geometry and other application specific factors, thereby improving cooling abilities for the hot gas path component. In addition, any number of channels 308 may be formed in the member 302, depending on desired cooling performances and other system constraints.

In embodiments, the cooling fluid is any suitable fluid that cools the turbine components and selected regions of gas flow, such as high temperature and pressure regions of the shroud 300. For example, the cooling fluid supply 312 is a supply of compressed air from the compressor 102, wherein the compressed air is diverted from the air supply routed to the combustor. Thus, the supply of compressed air bypasses the combustor 104 and is used to cool the shroud 300. Accordingly, the improved arrangement of channels 308 reduces the amount of compressed air used for cooling by improving cooling of the turbine components and regions near the components. As a result, an increased amount of compressed air is directed to the combustor 106 for conversion to mechanical output to improve overall performance and efficiency of the turbine 100 while extending turbine component life by reducing thermal fatigue. Further, the disclosed arrangement of the shroud 300 and channels 308 provides a more uniform temperature distribution along surface 304. In aspects, turbine components or parts, including the shroud 300, are formed of stainless steel or an alloy, where the parts may experience creep, oxidation and thermal fatigue if not properly cooled during engine operation.

Figure 4:
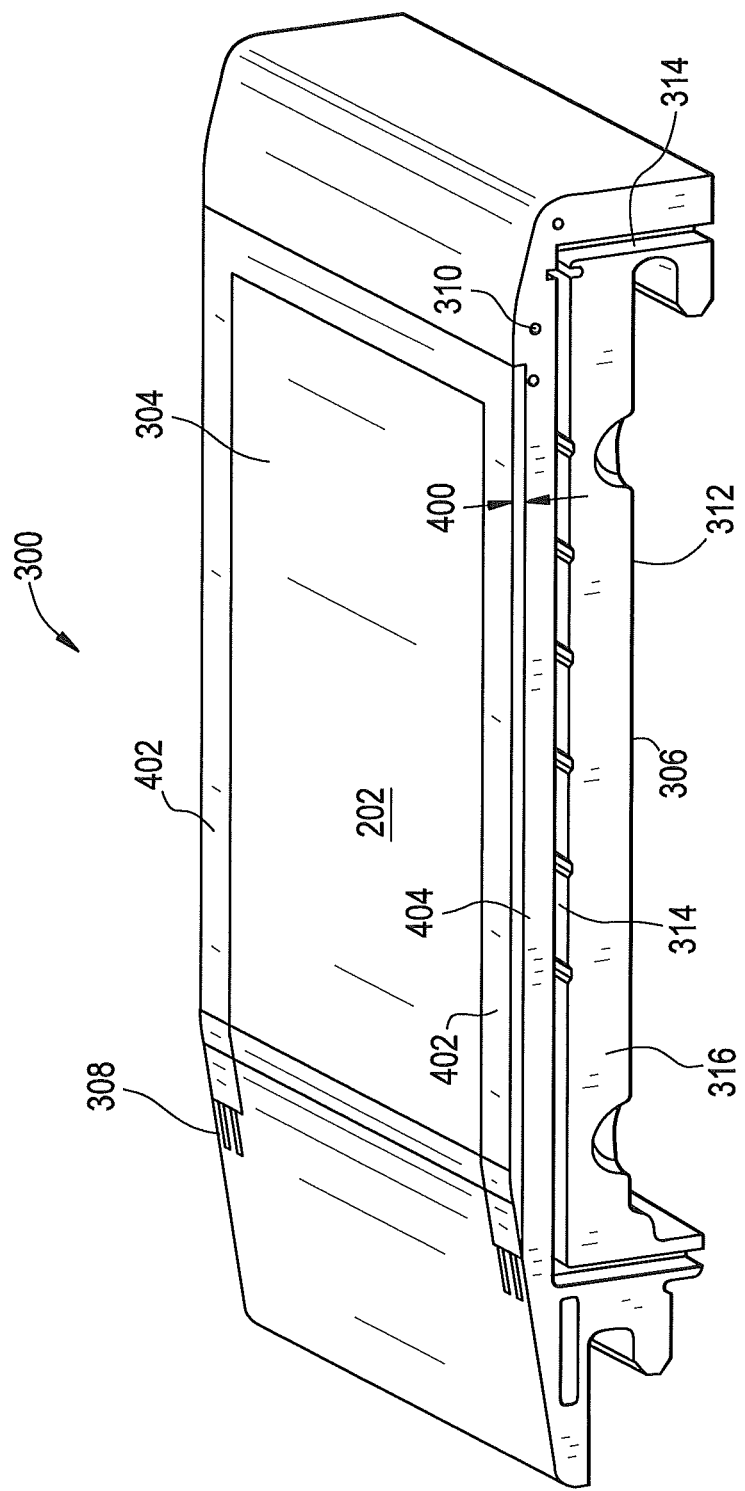
FIG. 4 is another perspective view of the hot gas path component to be placed in a gas turbine.

FIG. 4 is another perspective view of the shroud 300. As depicted, the shroud 300 includes a layer 402 (also referred to as "skin layer" "cover member" or "cover piece") disposed on the channels 308 in surface 304, thereby enclosing the channels 308. In an embodiment, the layer 402 is coupled to the surface 304 after channels 308 are formed in the member 302. Thus, the enclosed channels 308 provide improved cooling and reduced thermal fatigue for the shroud 300. In the depicted embodiment, the layer 402 is a suitable configuration, such as the exemplary U shaped member. The layer 402 may be formed from the same or different material as the shroud 300. Exemplary materials for the layer 402 include alloys, such as nickel or cobalt base superalloys. Further, the layer 402 may be any suitable geometry or configuration to cover and enclose the channels 308. The layer 402 may also comprise one or more members configured to enclose and/or cover the channels 308. The layer 402 is coupled to the surface 304 and member 302 via a suitable bonding method, such as brazing, linear friction welding and diffusion bonding. For example, the layer 402 is brazed to surface 304 by disposing a braze foil filler material 404 between the layer and surface 304. The filler material 404, member 302 and layer 402 are then heated to a selected temperature, wherein the filler material 404 is melted. The filler material 404, member 302 and layer 300 are then cooled to bond the layer 402 and member 302. The heating and cooling processes may be repeated to provide a heating cycle at selected temperatures to bond the parts. The brazing process heats the parts to a melting temperature for the filler material 404, wherein the temperature is below a melting point of the layer 402 and member 302.

With continued reference to FIG. 4, the illustrated layer 300 has a thickness 400 of less than about 1.5 mm to provide cooling channels 308 that are less than about 1.5 mm from the surface 304. In embodiments, the thickness 400 is less than about 1.2 mm. In other embodiments, the thickness 400 is less than about 2.5 mm. In embodiments, the thickness 400 is less than about 0.8 mm. In yet other embodiments, the thickness 400 ranges from about 0.4 mm to about 0.6 mm. By providing the relatively thin layer 300 to cover and encapsulate the channels 308, the improved cooling of the shroud 300 extends the life of the hot gas path component. In one embodiment, the layer 402 is formed to fit the opening for channels 308 in member 302, wherein the layer 402 does not have to have a protruding portion removed. Thus, the layer 402 is disposed on and coupled to the surface 304 via brazing or another suitable method, as described above, and provides a substantially uniform profile with surface 304.

Figure 5:
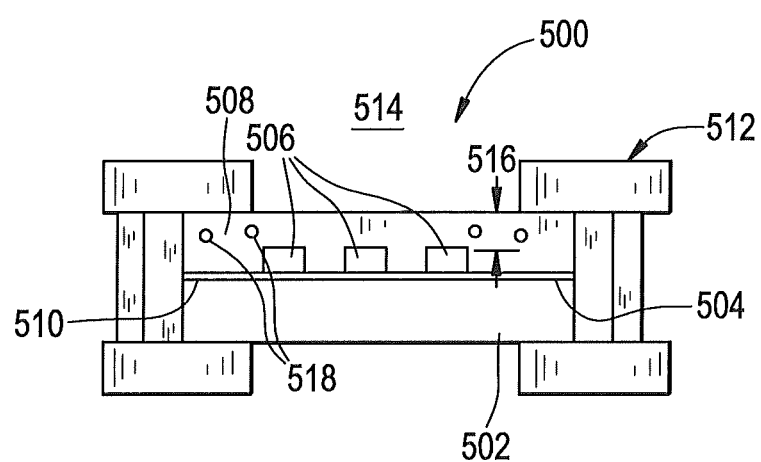
FIG. 5 is yet another schematic side view of an exemplary hot gas path component to be placed in a gas turbine.

FIG. 5 is a schematic side view of another exemplary hot gas path component 500. The hot gas path component 500 includes a member 502 with a surface 504, wherein a filler material 510 is placed between the surface 504 and a layer 508. Channels 506 are formed in a surface 507 of the layer 508. In an embodiment, the layer 508 is less than about 2.5 mm thick. During an assembly process, the parts of the hot gas path component 500 are held together by a clamping device 512. An exemplary brazing process for the hot gas path component 500 includes the following steps. Channels 506 are formed in the layer 508 by a suitable method, such as milling. Further, cooling holes 518 are formed by a suitable method, such as drilling. The filler material 510 is then placed on the surface 507 of the layer 508. The filler material 510 is placed on the surface 504 and the layer 508 is then placed on the member 502, thereby enclosing channels 506. The member 502, filler material 510 and layer 508 are heated to a selected temperature for a selected amount of time, wherein the selected temperature is above a melting point of the filler material 510 and below a melting point of the member 502 and the layer 508. After the heating cycle, the hot gas path component 500 is then cooled, thereby forming a bond between the member 502 and the layer 508 via the hardened filler material 510. In an embodiment, the channels 506 have a relatively small distance 516 to a hot gas path region 514 in the turbine system, thereby improving cooling and reducing creep, oxidation and thermal fatigue for the hot gas path component 500 through improved cooling efficiency.

After completion of the brazing process, the component surfaces can be drilled for cooling holes and also coated using a thermal spray process or other coating processes. Hot gas path components in gas turbines are sometimes coated with McrAlY (metallic) bond coats and/or thermal barrier coating (ceramic) top coats. Cooling holes are also drilled in the hot gas path components to provide film cooling fluid/air to cool the part and the coating. In embodiments, after service of the turbine system, the parts are inspected, repaired if necessary and put back in service. Repair typically involves stripping the coating, inspection, welding or brazing to repair the defects such as cracks or loss of material. The parts are then coated and heat treated. Reopening and/or machining of cooling holes on repaired components can be a difficult and tedious process. In the embodiment shown in FIG. 5, the layer 508 has the cooling holes 518 and coating, the layer 508 can be drilled and/or coated prior to brazing it to the component 500, thereby simplifying the repair process. In an embodiment, a service run component can be modified to remove local thermally damaged regions or "hot spots." Cooling channels can be machined while the component is not assembled and the layer 508 can be brazed/bonded to form the shroud 500 or other hot gas path component. The layer 508 can be drilled for cooling holes and also coated with metallic and ceramic coatings prior to brazing/bonding to the component. It should be noted that this arrangement and method may be used during a manufacturing or repair process for the component 500.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for manufacturing a hot gas path component of a turbine, the method comprising:
    forming cooling channels in a surface of a member;
    disposing a layer on the surface of the member to enclose the cooling channels, the layer being disposed on a portion of the member to be cooled; and
    bonding the layer to the surface, wherein bonding comprises heating the member and the layer, wherein bonding the layer comprises disposing a braze filler metal between the layer and the surface and heating the layer, the member and the braze filler metal to a selected temperature.

2. The method of claim 1, wherein the selected temperature comprises a temperature greater than about 1800 degrees Fahrenheit.

3. The method of claim 1, wherein the braze filler material comprises a metallic foil.

4. The method of claim 1, wherein forming cooling channels comprises investment casting the cooling channels in the member.

5. The method of claim 1, wherein forming cooling channels comprises machining the cooling channels in the member.

6. The method of claim 1, wherein forming cooling channels comprises forming the channels using at least one of a water jet, a mill, a laser, and electric discharge machining.

7. The method of claim 1, wherein disposing the layer comprises disposing the layer with a thickness less than about 0.8 mm.

8. A method for manufacturing a hot gas path component of a turbine, the method comprising:
    forming cooling channels in a surface of a member;
    disposing a layer on the surface of the member to enclose the cooling channels, the layer being disposed on a portion of the member to be cooled; and
    bonding the layer to the surface, wherein bonding comprises heating the member and the layer, and wherein bonding the layer comprises diffusion bonding the layer and member at a selected temperature.

9. A hot gas path turbine component, the component comprising:
    a member with cooling channels formed in a surface of the member;

a layer disposed on the surface of the member to enclose the cooling channels, wherein a thickness of the layer is less than about 0.8 mm and wherein the layer is bonded to the surface by heating the member and the layer; and a braze filler metal disposed between the layer and the surface.

10. The component of claim 9, wherein the braze filler metal, member and layer is heated to a selected temperature greater than about 2125 degrees Fahrenheit.

11. The component of claim 9, wherein the braze filler material comprises a metallic foil.

12. The component of claim 9, wherein the cooling channels are formed by one selected from the group consisting of: investment casting the cooling channels in the member, machining the cooling channels in the member and by using a water jet.

13. The component of claim 9, wherein the layer has cooling holes drilled before the layer is bonded to the member.

14. The component of claim 9, wherein the layer has is coated before the layer is bonded to the member.

15. The component of claim 9, wherein bonding the layer comprises diffusion bonding the layer and member at a selected temperature.

16. The component of claim 9, wherein the layer is coated and has cooling holes drilled after the layer is bonded to the member.

17. A hot gas path turbine component, the component comprising:

a first member with cooling channels formed in a surface of the first member;

a filler material disposed on the surface of the first member; and a second member disposed on the filler material and surface of the first member to enclose the cooling channels, wherein a thickness of the first member or the second member is less than about 2.5 mm, and wherein the layer is bonded to the surface by heating the filler material, first member and second member to a selected temperature.

18. The component of claim 17, wherein the selected temperature is less than a melting point of the first and second members and greater than a melting point of the filler material.

\* \* \* \* \*

UNITED STATES PATENT AND TRADEMARK OFFICE
CERTIFICATE OF CORRECTION

PATENT NO. : 8,870,523 B2  Page 1 of 1
APPLICATION NO. : 13/042167
DATED : October 28, 2014
INVENTOR(S) : Kottilingam et al.

It is certified that error appears in the above-identified patent and that said Letters Patent is hereby corrected as shown below:

In Column 2, Line 16, delete "combustor 100" and insert -- combustor 104 --, therefor.

In Column 3, Line 18, delete "surface 210," and insert -- surface 204, --, therefor.

In Column 4, Line 31, delete "combustor 106" and insert -- combustor 104 --, therefor.

In Column 4, Line 65, delete "layer 300" and insert -- layer 402 --, therefor.

In Column 5, Lines 5-6, delete "layer 300" and insert -- layer 402 --, therefor.

In Column 5, Line 13, delete "layer 300" and insert -- layer 402 --, therefor.

In Column 6, Line 5, delete "shroud 500" and insert -- shroud 300 --, therefor.

In Column 7, Line 18, in Claim 14, delete "layer has is" and insert -- layer is --, therefor.

Signed and Sealed this
Twenty-eighth Day of March, 2017

Michelle K. Lee
*Director of the United States Patent and Trademark Office*